(12) United States Patent
Jacobsen et al.

(10) Patent No.: US 12,013,298 B2
(45) Date of Patent: Jun. 18, 2024

(54) PROTECTIVE COVER FOR A PRESSURE SENSOR

(71) Applicant: Grundfos Holding A/S, Bjerringbro (DK)

(72) Inventors: Kjeld V. Jacobsen, Randers NV (DK); Casper Pedersen, Skive (DK); Per Ellemose Andersen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 478 days.

(21) Appl. No.: 17/297,158

(22) PCT Filed: Nov. 27, 2019

(86) PCT No.: PCT/DK2019/050366
§ 371 (c)(1),
(2) Date: May 26, 2021

(87) PCT Pub. No.: WO2020/108718
PCT Pub. Date: Jun. 4, 2020

(65) Prior Publication Data
US 2022/0026300 A1 Jan. 27, 2022

(30) Foreign Application Priority Data
Nov. 27, 2018 (DK) .................... PA 2018 70783

(51) Int. Cl.
*G01L 19/06* (2006.01)

(52) U.S. Cl.
CPC ................ *G01L 19/0645* (2013.01)

(58) Field of Classification Search
None
See application file for complete search history.

(56) References Cited

U.S. PATENT DOCUMENTS

| 5,983,727 | A * | 11/1999 | Wellman | G01L 9/0072 73/705 |
| 7,152,479 | B2 * | 12/2006 | Krause | G01L 19/146 73/756 |
| 7,383,736 | B2 * | 6/2008 | Esnouf | G01L 7/063 73/716 |
| 9,568,384 | B1 * | 2/2017 | Stith, Jr. | G01L 19/0654 |
| 9,593,995 | B2 * | 3/2017 | Wagner | G01L 19/0084 |
| 10,113,927 | B2 * | 10/2018 | Wade | G01L 9/0048 |
| 11,162,859 | B2 * | 11/2021 | Lei | A61M 1/367 |
| 11,402,288 | B2 * | 8/2022 | Feyh | G01L 9/0048 |
| 2014/0360501 | A1 * | 12/2014 | Guiducci | A61M 16/0003 128/205.23 |

FOREIGN PATENT DOCUMENTS

WO 2015153938 A1 10/2015
WO 2015186576 A1 12/2015

* cited by examiner

Primary Examiner — Peter J Macchiarolo
Assistant Examiner — Jermaine L Jenkins
(74) Attorney, Agent, or Firm — McGlew and Tuttle, P.C.

(57) ABSTRACT

The present invention relates to cover for a pressure sensor. The cover is configured for being arranged to cover a sensor element.

35 Claims, 10 Drawing Sheets

PROTECTIVE COVER FOR A PRESSURE SENSOR

FIELD OF THE INVENTION

The present invention relates to cover for a pressure sensor. The cover is configured for being arranged to cover a sensor element.

BACKGROUND OF THE INVENTION

It has been found that when a pressure sensor is used in a medium containing e.g. Fe-ions, there is a risk of Fe-oxides building up inside the sensor port and directly on the pressure sensitive sensor die/chip surfaces. Similar effects may be seen in a medium containing C, Ca, O, Mn, S or the like. These specific types of deposits/sediments are primarily created by a local reaction in the sensor between e.g Fe-ions transported through the media and oxygen slowly diffusing through the small O-rings encapsulating the sensor die/chip as well as through the sensor housing in which the sense die is arranged or other mechanical sealed parts. Such sediments/deposits can alter both the pressure sensitivity and offset of the sensor and eventually create false pressure measurements from the sensor. This will be a huge/major problem as the pressure measurement is used for controlling processes, pumps, valves or other types of systems, where a precise and stable pressure measurement is critical.

OBJECT OF THE INVENTION

In view of the above, a more efficient and/or reliable use of a pressure sensor would be advantageous.

It is a further object of the present invention to provide an alternative to the prior art.

SUMMARY OF THE INVENTION

Thus, the above described object and several other objects are intended to be obtained in a first aspect of the invention by providing a cover for a pressure sensor,
 the cover being configured to cover a pressure sensor element of a pressure sensor and for providing an internal cavity in-between the cover and the sensor element;
 the cover comprising
 a membrane made from a flexible material and defining at least a part of a wall member between the internal cavity and the exterior of the cover for communicating pressure from the exterior of the cover into the internal cavity, or vice versa, by flexing the membrane;
 one or more venting openings extending from the exterior surface of the cover and into the internal cavity,
 wherein the cover is configured, during use of the cover, to co-operate with the pressure sensor to fluidicly seal the internal cavity with the pressure sensor so as to allow fluid communication between the exterior of the cover and the internal cavity though said one or more venting openings.

The cover preferably at least partly covers the pressure sensor.

Thus, solution provided by the invention may be seen as to aim at a small exchange of fluid in regions close to the sensor element through the venting opening(s). The low fluid transport may significantly reduce the amount of chemical reactants and impurities transported by the fluid to regions close to the sensor element. This may eventually reduce the amounts of potentially critical sediments/deposits accumulated close to or directly on the sensor element surface(s). As a further result, this may significantly increase the lifetime of the sensor in applications prone to certain types of sedimentation and precipitations.

Specifically, in medias containing Fe-ions, the present invention may reduce the amounts of Fe-reactants transported into close proximity to the sensor element. This means that the creation of Fe-oxide sediments/precipitants in close proximity to the sensor element may also be significantly reduced, which again extends the sensors lifetime.

The present invention may even if not significant changing the amount of oxygen diffusing into a region around the sensor element have a positive effect. The lower fluid (e.g. water, coolant fluid, glycol or other fluid) exchange rate just above the sensor element may provide an overall higher local concentration of oxygen. The internal cavity may in other words contain an overall larger concentration of oxygen as compared to a sensor without a cover according to the present invention.

This major change in the local concentrations of both oxygen and Fe reactants close to the sensor element may further change the local distributions of potential Fe-oxygen reactions. This may eventually move the primary point of potential Fe-oxygen reactions much further away from the sensor elements and towards the venting opening in the cover. Hereby, the precipitation, if occurring, may be moved from the sensor element area to venting opening. A side effect of this change in the local Fe-oxygen reaction patterns may be, that the venting opening may to some extent get blocked by accumulated Fe-oxides which may further reduce the medium exchange in the chamber.

The flexible membrane may also ensure that potential deposits do not easily stick to the upper surface of the membrane. In slightly turbulent flow conditions near the top surface of the membrane therefore have more freedom to move/wobble depending on the local pressures on the membrane surfaces (small local difference pressures generated by local flow). Furthermore, during changes in temperature the membrane can also more freely expand or contract. Such potential small dynamic movements of the membrane in operation will ensure that thick deposits will not easily be able to accumulate to the membrane during operation.

In the present context, terms are used in a manner being ordinary to a skilled person. However, some of the used terms are elaborated below.

"Pressure sensor" is preferably used to reference a combination of a pressure sensor housing accommodating a sensor element. The sensor element is typically in a recessed position relatively to an outer surface the sensor housing, but may be arranged flush with or even extending above the surface of the sensor housing.

"A sensor element" is preferably used to reference an electronic element providing an electrical signal or having an electrical conductance, electric capacity or the like, representing a pressure or a pressure difference applied to or across the element. The sensor element may be a so-called pressure die.

"Membrane" is preferably used to reference a designated section of a cover having on one side an internal cavity and on the other side the exterior of cover. The membrane may in some preferred embodiment have a smaller thickness than other sections of the cover and is typically a wall section suspended at is perimeter by other sections of the cover. "Suspended" may also include that the designated section and regions outside this section or even the whole cover is made in one piece and from the same material or material composition. A cover may be moulded or 3D-printed to include the designated section. In other embodiments, the membrane is a section made from a different material than a region outside the membrane or even the whole cover. The outer surface of the membrane typically forms the interface to the fluid in which a pressure is to be measured. The dimensions of the membrane may be selected for optimal stability and performance of the design, and furthermore, to ensure that the stiffness of the membrane does not influence the overall performance and sensitivity of the sensor in operation.

In general, the membrane itself will have a certain stiffness. This may typically either be provided via a (often very) stiff material, for example a metal material, which however has a low thickness and/or a special form such as a corrugated structure to make it deformable, or it could be provided via a material with a lower stiffness, for example silicone. Accordingly, the overall membrane stiffness may preferably be defined by a combination of the overall geometry (thickness etc.) and the membrane material.

"Flexible membrane" is preferably used to reference that the membrane flexes sufficiently to communicate a pressure applied to the membrane substantially unaffected to the sensor element.

"Fluid channel" is preferably used to reference a channel having a longitudinal extension, which may be meandering or straight. The fluid channel may in some embodiments be an open channel in the sense that the channel forms a groove and in other embodiments, the channel may be closed forming a tubular structure. As presented herein, one of the objects is to prevent fouling particles from being deposited on a sensor element, hence placing the venting opening directly above the sensor element may preferably not be a desired option according to the invention.

"A depth" of the internal cavity is typically used to reference the distance between the plane defined by the opening of the cavity and membrane. Accordingly, depth does not as such refers to a specific spatial orientation.

"During use" is preferably used to reference the situation where a cover is applied to a sensor, which also include situations in which the pressure sensor with cover is used to obtain pressure measurements.

"Fluidicly seal" is preferably used to reference a situation where two or more separate elements are arranged mutually so that along the interface between the two or more separate elements a sealing is provided minimizing or even prevent a flow of fluid along the interface. In some embodiments a sealing element, such as a gasket, o-ring or the like is used and in other embodiments, the sealing may be provided by ductility of at least one of the materials at least at the interface provides the sealing. Fluidicly seal includes that fluid transport may take place between the internal cavity and the outside through the venting opening.

"Fluid" is preferably used to reference a fluid in liquid and/or gas phase.

The internal cavity may in some embodiments at least partly be formed in the cover as an open ended cavity with its opening facing, during use, towards the pressure sensor and the sensor element, and being delimited opposite to said opening at least partly by said membrane. Thereby an easy sealing may be provided between the pressure sensor and the cover, which sealing may advantageously be provided along a perimeter around the open ended cavity.

A cover according to preferred embodiments of the invention may further comprise one or more protrusions provided on an interior surface of the membrane and extending into the internal cavity. Such one or more protrusions may be provided as one or more segments not circumscribing a closed loop. In some preferred embodiments, one or more, such as all protrusions extend into the cavity by an amount being less than the depth of the cavity, such as less than or equal to 0.5 times the depth, preferably less than 0.4, such as less than 0.3, such as less than 0.2, preferably less than 0.1 times the depth. These protrusion may assure that the membrane does not contact the sensor element and/or block an opening leading into the sensor element, which could otherwise occur by applying a pressure to the outside of the membrane.

In some preferred embodiments of the cover, the frontal shape of the membrane may be polygonal, such as rectangular, circular or elliptical. This may provide an easy manufacturing process and/or rendering it relatively easy to determine the flexing of the membrane during use.

A cover according to some preferred embodiments may be produced with a thickness of the membrane which may be less than 1.0 mm, and which may be larger than 0.25 mm. Such a thickness has shown to produce a suitable flexing response of the membrane allowing pressure to be communicated efficiently to the sensor element in some situations of use.

In some preferred embodiments, the cover may form a tubular receptacle such as an elongate tubular receptacle, preferably comprising a cuboid shaped section, for housing the pressure sensor or at least a part thereof. The tubular receptacle preferably has a shape mating the pressure sensor To allow easy application of the cover on the pressure sensor, the cover may have an opening at one end for inserting the pressure sensor or at least a part thereof into the tubular receptacle. Preferably, the cover at the end distal to the opening for inserting the pressure sensor is open or closed.

Although the cover may provide a sufficient fluidic seal by its inner surface abutting the surface of the sensor, the sealing may be improved by the cover further comprising one or more longitudinal extending seal rims arranged along the longitudinal direction of the cover. Such longitudinal extending seal rims may inter alia improve the sealing between an upper and lower part of the sensor.

In preferred embodiments, the cover may further comprising one or more seal rims transversely encircling the sensor. Such sealing may inter alia improve the sealing between longitudinal sections of the sensor.

In some preferred embodiments of a cover, the membrane may be made from a material having a Young's modulus between 0.0005 GPa and 0.5 GPa, such as between 0.01 and 0.2 GPa, such as made from a material selected from the group consisting of rubber, silicone, plastic, polymer, composite materials or compositions thereof. In other embodiments, the membrane is made from metal(s), such a metals in combination with one or more of the materials. Such choices of material have also shown to produce a suitable flexing response of the membrane allowing pressure to be communicated efficiently to the sensor element in some situations of use.

In some embodiments of a cover, the membrane may be made from a corrugated metal sheet, typically having a Young's modulus around or above 200 GPa and the material of the cover in which the membrane is provided may made from a material selected from the group consisting of rubber, silicone, plastic, polymer, composite materials, metal(s) or compositions thereof. This combination has been found to be advantageous e.g. when the cover is to be used in a harsh environment.

According to preferred embodiments of a cover, one or more of the one or more venting openings may comprise a fluid channel extending between the internal cavity and an orifice provided in the exterior of the cover thereby providing a fluid passage extending between the internal cavity and the exterior of the cover. This has been found to limit the amount of fluid being exchanged between internal cavity and the exterior, since the volume of fluid channel represents a volume of fluid to be moved during flexing of the membrane.

In some preferred embodiments, the orifice may be arranged at a distance from the membrane.

In some preferred embodiments, the fluid channel may open into the orifice at a position being distal (distant) to the internal cavity.

In some preferred embodiments, the fluid channel may have a cross sectional area which is less than a cross sectional area of the internal cavity, preferably the cross sectional area of the internal cavity is defined as the surface area of the membrane.

In some preferred embodiments, the fluid channel(s) may extend meandering, such as meandering between the internal cavity and the opening/orifice in the exterior surface of the cover.

In some preferred embodiments, the venting opening, such as the fluid channel, into the internal cavity may be configured to provide a snorkel effect by comprising a volume being larger than the change in volume of the internal cavity, typically evaluated during use of the pressure sensor with cover.

In some preferred embodiments, the internal cavity may be in fluid communication with a sensing surface of the sensor element and wherein the venting opening may be offset from sensing surface, such as offset from an edge of the sensing surface and/or internal cavity in a direction parallel to a longitudinal axis of the sensor.

In some preferred embodiments, the fluid channel may extend away from the internal cavity in a direction having a vector component which may be parallel with the plane defined by the opening of the open ended cavity and wherein the fluid channel may open into the orifice at position being distal to the internal cavity.

In some preferred embodiments, the cover may have a longitudinal extension and the fluid channel extending between the internal cavity and the orifice may have a component which extends along a direction having a vector component which may be parallel to the longitudinal extension of the cover.

In some preferred embodiments, the open ended cavity may have one or more wall sections extending in direction away from said opening and towards said membrane. Preferably, the one or more venting openings, such as the one or more fluid channels, may extend from one or more of said one or more wall sections in a direction away from internal cavity.

In preferred embodiments, the orifice may be a through-going opening extending between the exterior surface and the interior surface of the cover and wherein the fluid channel may be provided by a groove formed in the interior surface of the cover. Such a groove may extend between the internal cavity and the orifice, and at least a section of the interior surface of the cover surrounding the groove and the orifice may be made from a material providing, during use, a fluidic seal against a surface of a pressure sensor, so that a closed channel is formed with interior surface of the cover forming a wall part of the closed channel. This has shown to provide a cover that may be applied to an existing pressure sensor without modifying the design of the existing pressure sensor; it should be clear that such embodiments are not limited to finding use for covering existing pressure sensors.

The fluid channel may in some preferred embodiments extend inside the cover between the interior and exterior surface of the cover and the orifice extends from the exterior surface and into the fluid channel. The orifice may in such embodiment be a through-going opening or may be an orifice terminating at the position of the fluid channel. Thereby a distinct fluid channel may be provided which may not demand a particular shaping of the pressure sensor.

According to some preferred embodiments of a cover, one or more of the one or more venting openings may be provided by an orifice provided in the exterior of the cover, extending through-going the cover and being configured for cooperating with a fluid channel, preferably being an open channel, provided in a surface of the pressure sensor. This fluid channel may extend between said internal cavity and said orifice, so as to provide, during use, a fluid passage extending between said internal cavity and the exterior of the cover. By providing the fluid passage in the pressure sensor—which typically may be made from a stiffer material than the cover, the risk of the channel collapsing e.g. caused by pressure applied to the cover may be reduced or even avoided.

In some preferred embodiment, the cover may comprise a sealing protrusion encircling the inner opening of the pressure port and protruding towards a surface of the sensor.

In some preferred embodiments, the cover may comprise a pressure port in a position distinct from the internal cavity. The pressure port may preferably be through-going opening extending between the interior surface of the cover and the exterior of the cover, wherein a section of the interior surface of the cover surrounding the pressure port is made from a material for providing, during use, a fluidic seal against a surface of a pressure sensor. Such a pressure port may advantageously be used to communicate e.g. an ambient pressure to the pressure sensor and thereby configure the cover to operate together with the pressure sensor as a relative pressure configuration.

In some preferred embodiments, the cover may be further configured for providing a distinct further internal cavity in-between the cover and the sensor element. This further internal cavity may be arranged distant from the internal cavity disclosed above. The cover may further comprise:
   a further membrane made from a flexible material and defining at least a part of a wall member between the further internal cavity and the exterior of the cover for communicating pressure from the exterior of the cover into the internal cavity, or vice versa, by flexing the membrane;
   one or more further venting openings extending from the exterior surface of the cover and into the further internal cavity.

Such a cover may be configured, during use of the cover, to co-operate with the pressure sensor to fluidicly seal the further internal cavity with the pressure sensor so as to allow fluid communication between the exterior of the cover and the further internal cavity though said one or more further venting openings. Thereby, embodiments of the cover particularly useful for use in a differential pressure configuration may be provided.

It is noted that the characteristics mentions above for the first referenced internal cavity, membrane, venting opening and other features may be applied to differential pressure embodiments of the cover.

In some preferred embodiments, the cover may form an elongate tubular receptacle, preferably comprising a cuboid shaped section. Such a shaping may provide a good fit between a pressure sensor and the cover often assuring the fluidic sealing.

In preferred embodiments of a cover comprising one or more fluid channels, the hydraulic diameter (as defined herein) of the fluid channel may be smaller than 5.0 mm, such as smaller than 3.0 mm, preferably smaller than 2.0 mm, such as smaller than 1.0 mm, preferably smaller than 0.5mm, such as smaller than 0.4mm. Such dimensions may provide an efficient dimensioning of the fluid channel.

A cover may in preferred embodiment be configured for fluidic sealing engagement with one or more engaging protrusions provided on the pressure sensor and encircling the sensor element, with the internal cavity interior of the one or more protrusion. This may provide an easy application of the cover onto the pressure sensor while still covering the sensor element and providing a fluidic sealing of the internal cavity.

Alternatively to the engaging protrusion, the cover may be configured for fluidic sealing engagement with one or more grooves provided in the pressure sensor and encircling the sensor element, with the internal cavity interior of the one or more grooves.

In a second aspect, the invention relates to a method of providing an at least partly covered pressure sensor comprising covering at least partly a pressure sensor with cover according to the first aspect. The pressure sensor may preferably be of type providing an electrical readout representative of a measured pressure.

In a third aspect, the invention relates to a method of measuring pressure, which method preferably comprises providing an at least partly covered pressure sensor according to the second aspect, arranging the at least partly covered pressure sensor in a fluid, preferably fluid in a pump, valve, manifold, pipe or boiler, and obtaining the electrical readouts from the pressure sensor.

In a fourth aspect, the invention relates to an at least partly covered pressure sensor comprising a pressure sensor at least partly covered by a cover according to the first aspect.

In a fifth aspect, the invention relates to a method for protecting a pressure sensor comprising a sensor element arranged in the pressure sensor, wherein at least a part of the sensor element may exposed to the exterior of the pressure sensor, the method may comprise arranging a cover according to the first aspect to fluidicly seal said internal cavity with the pressure sensor so as to allow fluid communication between the exterior of the cover and the internal cavity though said one or more venting openings.

BRIEF DESCRIPTION OF THE FIGURES

The present invention and in particular preferred embodiments thereof will now be described in more detail with reference to the accompanying figures. The figures show ways of implementing the present invention and are not to be construed as being limiting to other possible embodiments falling within the scope of the attached claim set.

In FIG. 2, the pressure sensor and the cover are disclosed separated;

DETAILED DESCRIPTION OF PREFERRED EMBODIMENTS

Figure 1:
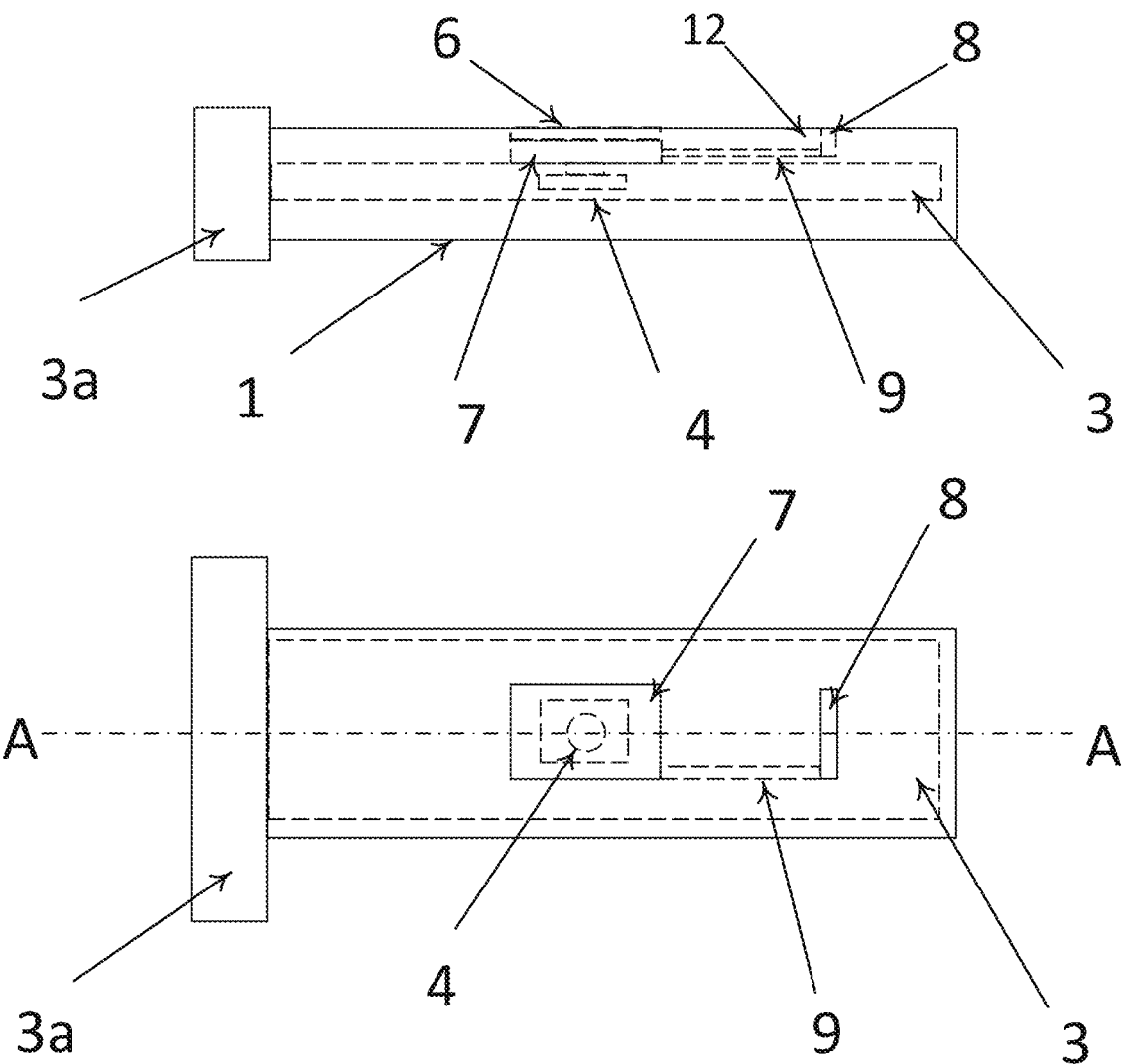
FIG. 1 is a schematic drawing illustrating a first embodiment of the invention, in the figure, the cover is illustrated as applied to a pressure sensor and the dotted lines illustrates internal elements and structures.

Reference is made to FIG. 1 schematically illustrating a first embodiment of a cover 1 for at pressure sensor 3. In the figure, the cover 1 is illustrated as applied to a pressure sensor 3 and in FIG. 2, the cover 1 and pressure sensor 3 are disclosed separate from each other. The pressure sensor 3 is in the disclosed embodiment an elongate member covered by the cover 1 and having a base part 3a not covered by the cover 1; the pressure sensor 3 is disclosed with dotted lines in FIG. 1 for the section covered by the cover 1. The upper part of FIG. 1 is a side view and the lower part of FIG. 1 is a frontal view. As illustrated the pressure sensor 3 as well as a cover 1 has a longitudinal direction from the base part 3a towards the other end of the sensor (or vice versa). As shown in the other figures, the sensors and covers typically has a similar longitudinal direction, but the invention is not limited to covers and sensors having a longitudinal direction.

Figure 2:
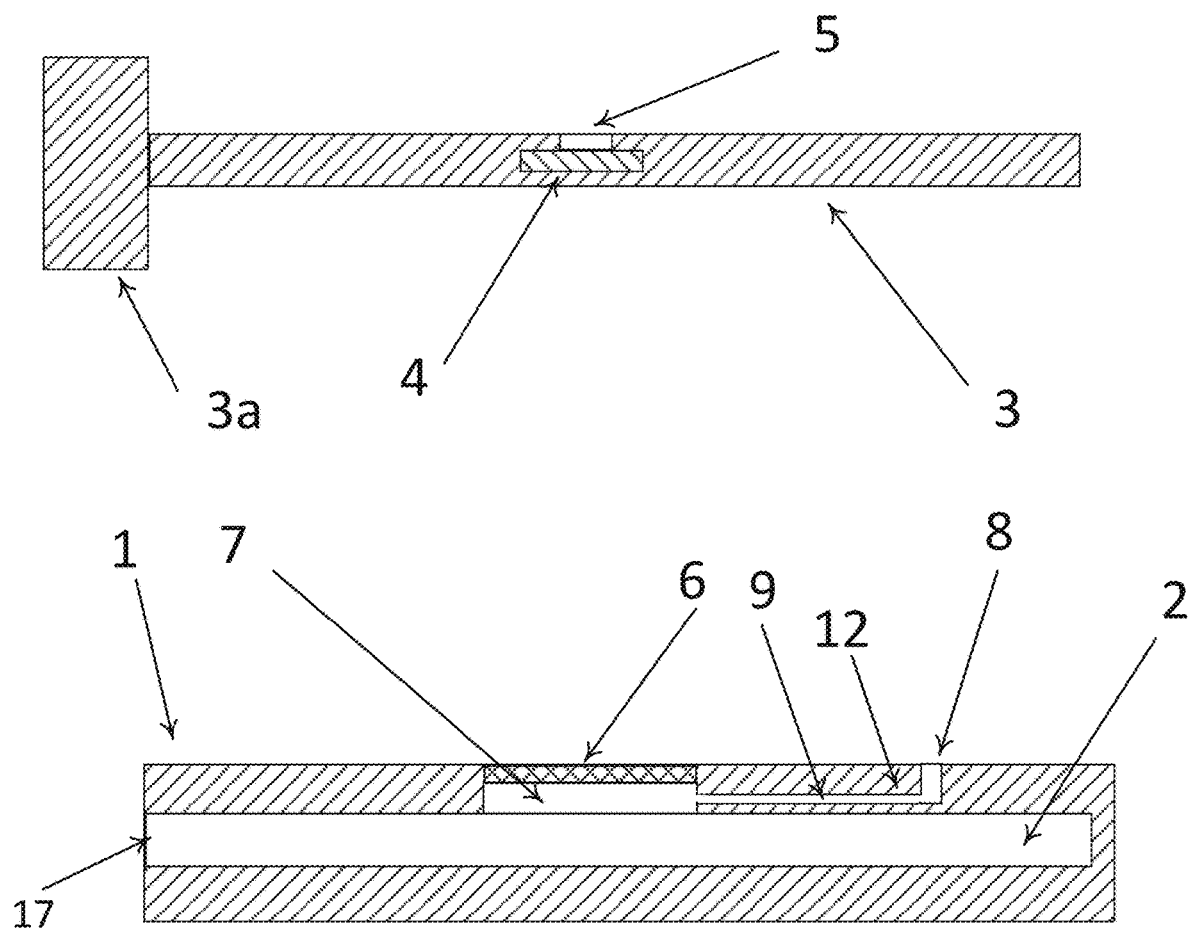
FIG. 2 is a cross sectional view along line A-A of FIG. 1.

To allow easy application of the cover 1 on the pressure sensor 3, the cover as shown in FIG. 1 has an opening 17 at one end for inserting the pressure sensor 3 or at least a part thereof into the tubular receptacle (see FIG. 2). The cover 1 is at the end distal to the opening 17 for inserting the pressure sensor closed, but may be open.

As will become apparent from the following disclosure, the cover 1 is configured to cover a pressure sensor element 4 of a pressure sensor 3 and for providing an internal cavity 7 in-between the cover 1 and the sensor element 4. In the embodiment disclosed in FIG. 1, the sensor element 4 is positioned recessed in the pressure sensor while still being exposed and the internal cavity 7 is provided as a cavity in an interior surface of the cover 1. The void constituting the recess in which pressure sensor element 4 is arranged may be included as a part of the internal cavity 7, although typically not alone constituting the internal cavity 7. However, it is considered within the scope of the invention to cover the recess with a cover 1 with a membrane 6 having a venting opening, thereby providing an internal cavity 7 formed by the recess.

The cover 1 disclosed has a membrane 6 made from a flexible material and defining at least a part of a wall member between the internal cavity and the exterior of the cover for communicating pressure from the exterior of the cover into the internal cavity, or vice versa, by flexing the membrane. By "membrane" is typically meant a material which is made from a sufficient elastic material and provided a thickness to allow the membrane to flex in response to a pressure variation so that the e.g. a pressure applied on the outside of the membrane will be communicated substantially unaffected to the pressure sensor element 4, so that the presence of the membrane does not substantially changes the readout provided by the pressure sensor element 4.

The membrane 6 may be provided in a number of ways as disclosed herein. In many preferred embodiments, the membrane 6 is provided by the wall thickness of the cover 1 at the position above the internal cavity 7 is less than the wall thickness of the cover 1 at least in a region encircling the internal cavity 7. Further, the material of the cover 1 encircling the internal cavity may in some embodiments sealingly abut the surface of sensor 3 thereby minimizing deformation of the cover 1 in regions away from the membrane 6 due to pressure applied on the outside of the cover 1, while still allowing for flexing of the membrane to communicate pressure to the sensor element 4.

Furthermore, the membrane is preferably also designed to avoid a mechanical filtering of pressure fluctuations. This can be accomplished by shaping the membrane (thickness and/or geometry) showing a minimised damping characteristic. Such designing may either be carried out experimentally or numerically.

To provide for fluid transport into/out from the internal cavity 7, one or more venting openings 12 extending from the exterior surface of the cover 1 and into the internal cavity 7 is provided. In the embodiment disclosed in FIG. 1, the venting opening 12 is comprised by the orifice 8 and the channel 9 connecting the exterior of the cover 1 and the internal cavity 7, which will be disclosed in greater details below.

As illustrated in FIG. 1, the orifice 8 is arranged at a distance from the membrane 6. Further, the fluid channel 9 opens into the orifice 8 at a position being distal (distant) to the internal cavity 7.

The fluid channel 9 (as illustrated) may have a cross sectional area which is less than a cross sectional area of the internal cavity 7, where the cross sectional area of the internal cavity 7 preferably is defined as the surface area of the membrane. 6.

The internal cavity 7 is in fluid communication with a sensing surface of the sensor element 4 and the venting opening, in this embodiment comprises by the fluid channel 9 leading to the orifice 8, is offset from the sensing surface.

The cover 1 is configured, during use of the cover, to co-operate with the pressure sensor to fluidicly seal the internal cavity with the pressure sensor so as to allow fluid communication between the exterior of the cover and the internal cavity though said one or more venting openings. This sealing is preferably provided so that the only fluid communication as per design between the internal cavity 7 and the exterior is through the venting opening 12. As "per design" is typically meant that although the sealing should be absolutely fluidic tight, some fluid may bypass the sealing or diffuse through the device. This sealing may be provided by the internal surface of the cover abuttingly sealing, during use, the surface of the pressure sensor. The sealing may be provided by a sealing element (not disclosed) or by the material being sufficiently flexible (ductile) to provide a seal.

When the cover 1 is used, that is arranged on a pressure sensor and/or placed in an environment for which the pressure measurements are to be provided, the fluid often being liquid of this environment will, initially, gradually replace the fluid often being air present in the internal cavity 7 and in the venting opening 8 by a pumping action provided by pressure changes applied onto the membrane 6 from the outside and/or by buoyancy driven fluid transport.

Once the fluid of the environment occupies the internal cavity 7 (including the recess if the sensor element 4 is recessed) and the venting opening 12, further pressure changes will not provide a substantial exchange of fluid between the fluid present in the internal cavity 7 and the fluid outside cover 1. This has the advantage that in case the fluid has a tendency to clog or provide deposits on the sensor element 4 clearly being a disadvantage as it has a tendency to create false pressure readings, such clogging or deposition is substantially limited as substantially the same fluid over time will be present in the internal cavity 7 thereby reducing the amount of "new clogging material" entering the internal cavity 7.

The venting opening 12 into the internal cavity may in some embodiments be considered to be a snorkel which is designed with a volume being larger than the change in volume of the internal cavity during use of the cover 1. Hereby, the fluid exchange will after the cover 1 has been in use for some time, only affect the fluid present in the venting opening 12, thereby preventing exchange of fluid in the internal cavity 7. While this is disclosed with reference to FIG. 1, this may be applied to other embodiments falling within the scope of the invention, thereby also the other embodiments disclosed herein.

Figure 10A:
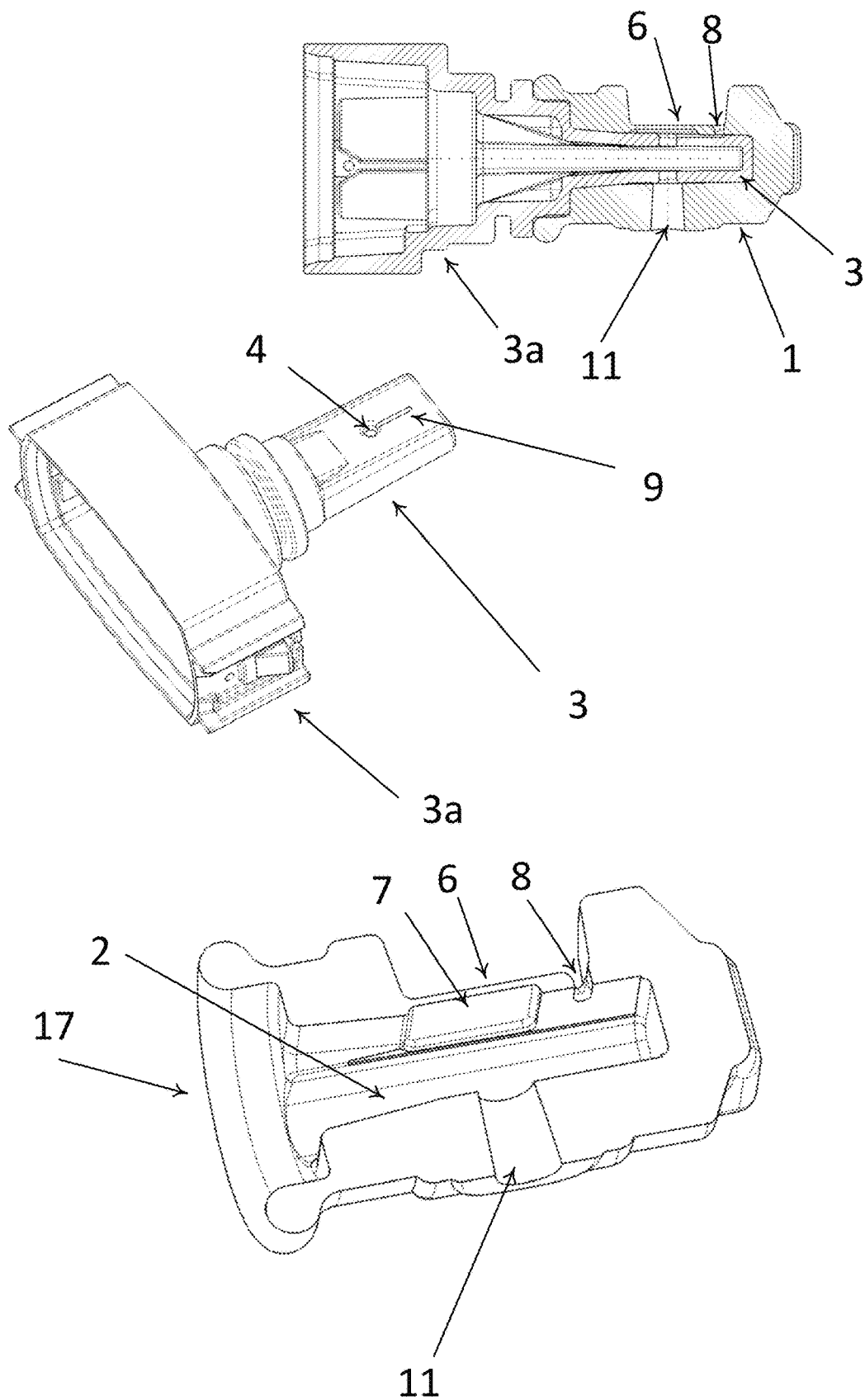
FIG. 10a is a drawing illustrating a cover arrangement according to a eleventh embodiment of the invention; upper part of FIG. 10 is a cross sectional longitudinal view through a sensor and cover, middle part of FIG. 10a illustrates a pressure sensor according to the invention, and lower part of FIG. 10a illustrates a perspective cross sectional view the cover (as disclosed in upper part of FIG. 10a) according to a ninth embodiment.
Figure 10B:
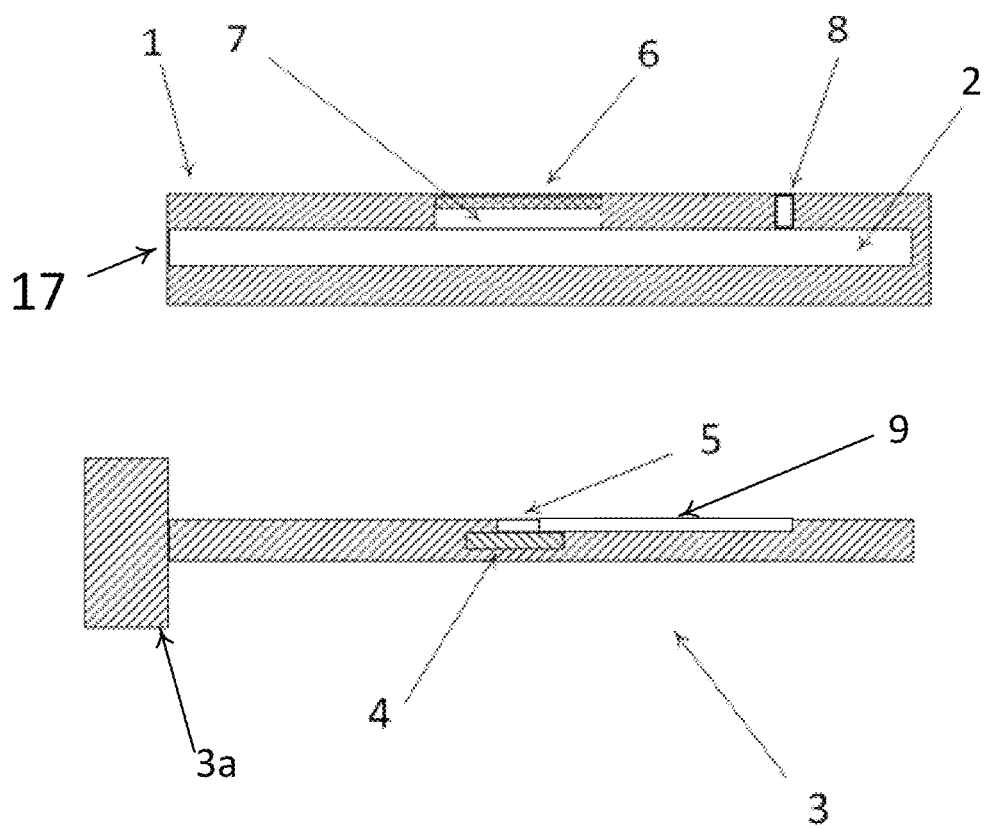
FIG. 10b is a schematic drawing illustrating a cross sectional longitudinal view through the sensor with a cover as illustrated in FIG. 10a, and FIG. 11 is a perspective cross sectional view of a cover according to a twelfth embodiment.
Figure 11:
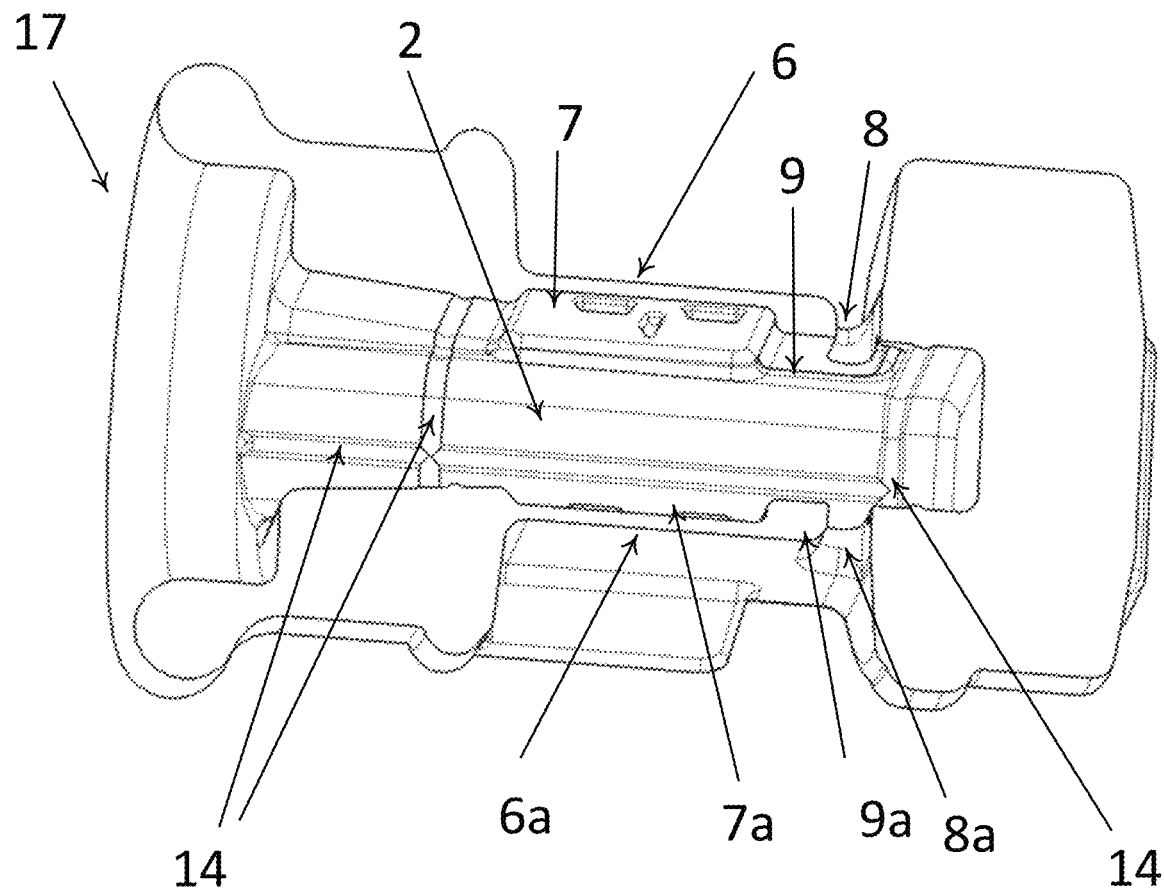

As illustrated in FIGS. 1, 2, 3, 10 and 11 the internal cavity 7 and for FIG. 11, the further internal cavity 7a, may be formed in the cover 1 as an open ended cavity with its opening facing, during use, towards the pressure sensor 3, and being delimited opposite to the opening facing the pressure sensor by the membrane 6. As for the embodiment in FIGS. 4, 5, 6 and 7, the cover may be viewed as forming an internal cavity 7, at least when applied to a pressure sensor 3.

Figure 3:
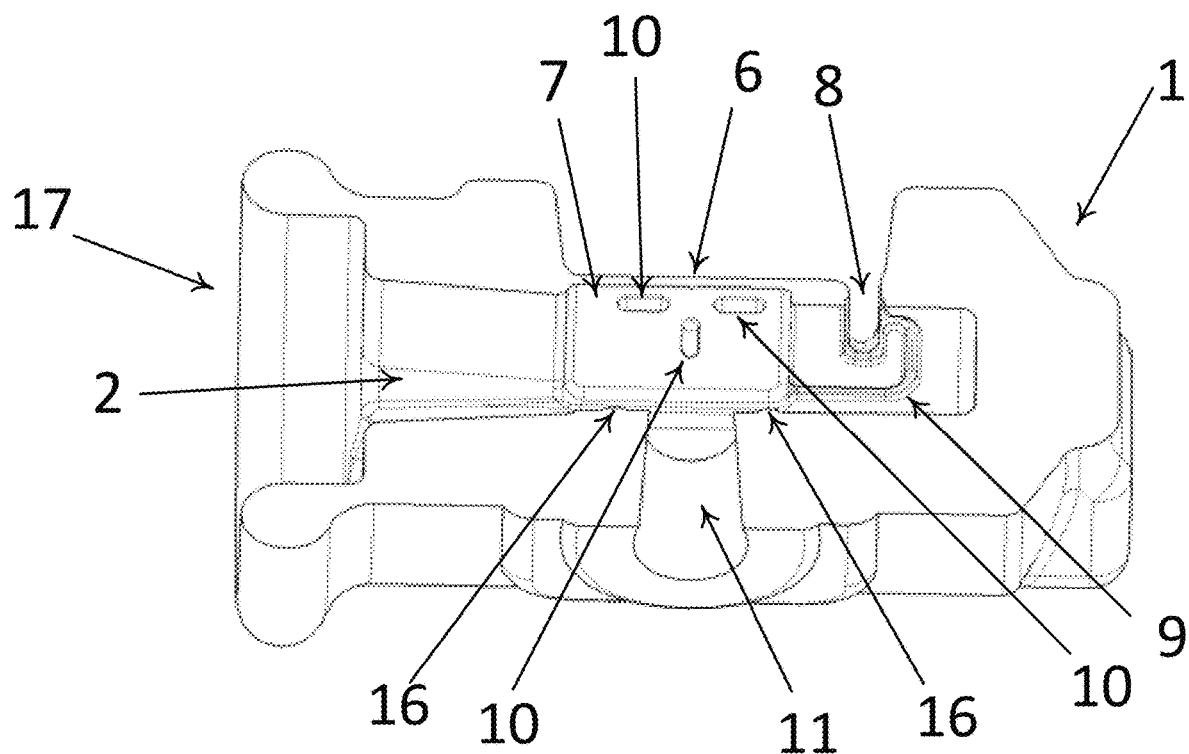
FIG. 3 shows two longitudinal cross sectional views of a second embodiment of a cover according to the invention. The cross sectional views are taken perpendicular to each other; in the upper part of FIG. 3, the hatching has been left out for clarity reasons and the view is shown as a perspective view.
Figure 3:
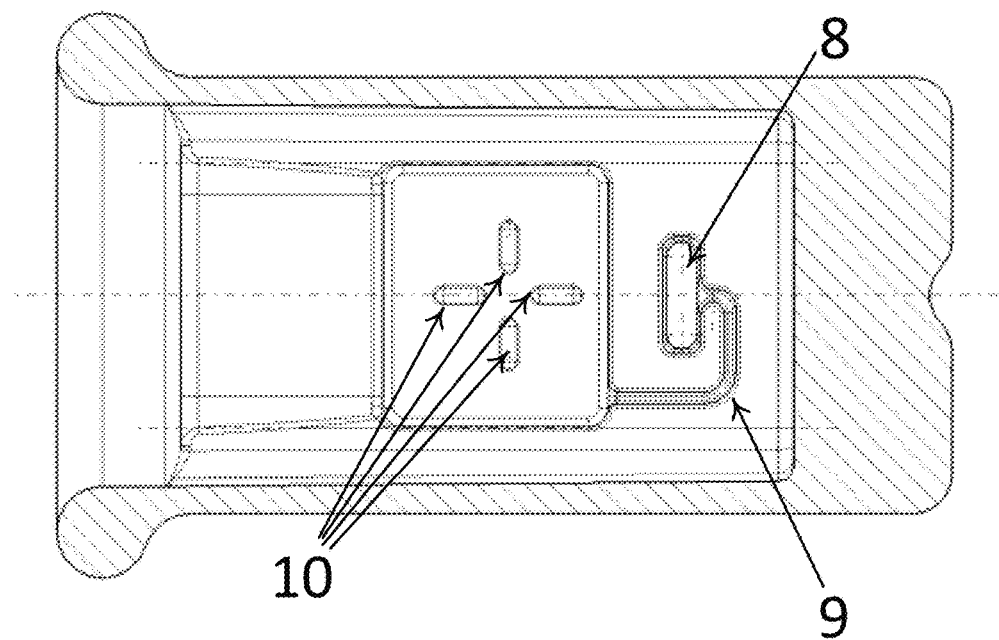

As presented e.g. in FIG. 3, a cover according to preferred embodiments of the invention may comprise one or more protrusions 10 provided on an interior surface of the membrane 6. A purpose of such protrusions 10 is to limit the degree of bending of the membrane 6 towards the pressure sensor 3 by acting as mechanical stops when the protrusions abut the surface of the pressure sensor. Thereby blocking or sealing off of the pressure sensor element 4 by the membrane may be prevented.

The one or more protrusions 10 are typically provided as one or more segments not circumscribing a closed loop (such as around the sensor element)—e.g. as illustrated in FIG. 3 where four protrusions are provided in a cross configuration with an open space in the middle of the cross, so as to prevent fluid to be trapped in a space defined by the protrusions 10 when the membrane 6 flexes.

The protrusions 10 may preferably extend into the internal cavity 7 by an amount being less than the depth of the internal cavity 7. The height, measured from the inner surface of the membrane 6, of the protrusions is typically less than or equal to 0.5 times the depth, preferably less than 0.4, such as less than 0.3, such as less than 0.2, preferably less than 0.1 times the depth of the internal cavity 7. In an alternative embodiment being within the scope of the invention, the protrusions 10 are provided on the surface of the pressure sensor 3 either only on the pressure sensor 3 or in combination with protrusions 10 in the cover 1.

The protrusion 10 are in the embodiment shown in FIG. 3 dimensioned so as to have a length of 1.4 mm, a width of 0.4 mm and a height of 0.25 mm. The depth of the internal cavity 7 is 0.57 mm and the thickness of the membrane is 0.35 mm. These dimensions are typical dimensions and deviations therefrom are clearly within the scope of the invention. Similar or even identical dimensioning may be applied to other embodiments shown herein as well as embodiments in general falling within the scope of the invention.

The thickness of the membrane may typically be less than 1.0 mm, and larger than 0.25 mm. By thickness is typically meant a distance evaluated between the interior surface of the membrane and the outer surface thereof.

The membrane is typically made from a material having a Young's modulus between 0.0005 GPa and 0.5 GPa, such as between 0.01 and 0.2 GPa. In a particular preferred embodiment, silicone rubber having a Young's module in the region of 0.0007 GPa (shore A 30 or shore 73) is used. Suitable materials are found to be a material selected from the group consisting of rubber, silicone, plastic, polymer, composite materials, or compositions thereof. Metal(s) preferably having a Young's module around or above 200 GPa may also be used.

Another way to provide flexibility to the membrane 10 is to form the membrane from a corrugated metal sheet, typically having a Young's modulus around or above 200 GPa. The material of remainder of the cover 10 in which the membrane is provided may be made from a material selected from the group consisting of rubber, silicone, plastic, polymer, composite materials, metal(s) or compositions thereof.

While it may be preferred to produce the cover 1 from a single material, the cover 1 may be made by embedding a membrane 6 made from a material as disclosed above, in a different material which forms the remainder or at least part thereof of the cover. Such examples includes rubber, silicone, plastic, polymer, composite materials, metal(s) or composition thereof.

As presented e.g. in FIG. 1-3, one or more of the one or more venting openings 12 comprising a fluid channel 9 extending between the internal cavity 7 and an orifice 8 provided in the exterior of the cover thereby providing a fluid passage extending between the internal cavity 7 and the exterior of the cover 1. In the embodiments disclosed in FIG. 1-3 only one such venting opening 12 with a channel 9 and orifice 8 is present, however the invention should not be limited to only include one such venting opening 12.

In the particular embodiment disclosed in FIG. 3, the fluid channel 9 extends meandering. This has inter alia the advantage of increasing the length of the channel when space is limited; such increased length may be used to allow only the fluid present in a part of the fluid channel (the part facing the orifice) to be exchanged with the surroundings, leaving the fluid in the internal cavity 7 substantially unexchanged. As further illustrated in FIG. 3, the fluid channel 9 opens into the orifice 8 at a position being distal to the internal cavity 7.

With reference to embodiment of FIG. 3, the orifice 8 is formed as a through-going opening extending between the exterior surface and the interior surface of the cover 1. The fluid channel 9 is provided by a groove (open channel) formed in the interior surface of the cover 1 and the groove extends between the internal cavity 7 and the orifice 8. At least a section of the interior surface of the cover 1 surrounding the internal cavity 7, the groove and the orifice 8 is made from a material providing, during use, a fluidic seal against a surface of a pressure sensor.

In an alternative embodiment, as illustrated in FIGS. 1-2 the fluid channel 9 (most clearly seen in FIG. 2) extends inside the cover 1 between the interior and exterior surface of the cover. In such embodiments, the orifice 8 extends from the exterior surface and into the fluid channel 9; however, the orifice may be provided as a trough-going opening also in such embodiments.

With reference to FIG. 10a a further embodiment is disclosed according to which a venting opening 12 is partly provided by the pressure sensor 3 comprising a fluid channel 9 between an orifice 8 and the internal cavity 7. As illustrated in FIG. 10a, the venting opening 12 is provided by an orifice 8 provided in the exterior of the cover 1, extending through-going the cover 3 and being configured for cooperating with the fluid channel 9, preferably being an open channel (a groove), provided in the surface of the pressure sensor 3 facing the orifice 8 and the internal cavity 7. The fluid channel 9 extends between internal cavity 7 and the orifice 9, so as to provide, during use, a fluid passage extending between internal cavity 7 and the exterior of the cover thereby forming the venting opening 12.

For the sensor 3 to operate as desired, it is necessary to have the pressure reaching the sensor element 4. This means that the recess in which the sensor element 4 is arranged (also referred to as a measuring port) may not be totally blocked. The balance in the design of the cover 1 is to protect the sensor element 4 by reducing the exchange rate of the fluid which is getting to the sensor element 4 but still having to make sure that the pressure is getting here and being possible to measure. A key element for solving this may be the cover 1 since it seals up against the sensor housing but in the area where the sensor element 4 is, there is designed a thinner section (membrane 6 ) in the cover 1.

This membrane 6 is "lifted of" the sensor housing whereby the internal cavity 7 is created between the membrane 6 and the sensor 3. To ensure that the membrane 6 will not deform and seal against the sensor 3, four small protrusions 10 in form of ribs as shown in FIG. 3 may be formed on the membrane 6 surface toward the sensor 3. They may preferably be small in order to not reduce the flexibility of the membrane 6.

A small channel 4 is made inside the sealing sleeve to improve ventilation of the sensor element cavity for potential air pockets. During the initial time in operation, this channel will also enable the medium to enter the chamber and letting out the air inside the membrane cavity. If the channel 4 over time gets partially blocked by sediments, the membrane 1 is still flexible enough to transfer the pressure from the application onto the sensor element and (further (more)) compensate for any thermal expansion of the medium in the chamber.

With reference to FIG. 10b, the embodiments shown in FIG. 10a is disclosed schematically, to make it clearer that the internal cavity 7 is formed as an open ended cavity with its opening facing, during use, towards the pressure sensor 3, and being delimited opposite to said opening at least partly by said membrane 6. Further, the cross sectional view of the sensor 3 clearly shows the channel 9 is formed in the sensor 3.

In some situations, an aim is to measure a relative pressure, e.g. in the sense that pressure is measured relatively to a specific reference, e.g. atmospheric pressure, and the embodiments of the cover 1 disclosed in FIGS. 3 and 10a,b are found to particular useful for such application. As disclosed, one side of the cover 1 has an internal cavity and a venting opening 12 comprising a orifice 8 and a fluid channel 9. On the opposite side, the cover 1 comprising a pressure port 11 in a position distinct from the internal cavity 7. The pressure port 11 is a through-going opening extending between the interior surface of the cover 1 and the exterior of the cover 1 and a section of the interior surface of the cover 1 surrounding the pressure port 11 is made from a material for providing, during use, a fluidic seal against a surface of a pressure sensor 3. Please note that although the pressure port 11 is disclosed to be located on the opposite side of the cover 1, the position of the pressure port 11 is determined by the position of the sensor element 4 used, whereby the pressure port may be arranged at different positions.

As illustrated in FIG. 3, there is shown two small bumps on the inner surface of the bottom half of the cover. These two bumps are cross sections of a sealing protrusion 16 encircling the inner opening of the pressure port 11 and protruding towards a surface of a sensor. The sealing protrusion is used to establish a seal around the surface of the sensor, when the cover is provided on the sensor. It is noted that a flat surface against a flat surface could also be used, although in the preferred embodiment shown in FIG. 3, the sealing protrusion 16 will often establish a more efficient seal. Such a sealing protrusion could also be provided in the embodiment shown in FIG. 10A.

In further embodiments, more than one sensor element 4 are arranged in the sensor and in such embodiments, one of the sensor elements may be covered so as to have an internal cavity above the sensor element and another may be covered so as to have a pressure port 11.

In some situations an aim is to measure a differential pressure, e.g. in the sense that a pressure difference between two positions in a fluid is to be determined, and the embodiment of the cover 1 disclosed in FIG. 11 has been found to be useful in such situations. In such and other embodiments, the cover 1 being configured for providing a distinct further internal cavity 7a in-between the cover 1 and the sensor element 4. The further internal cavity 7a being distant from the other internal cavity 7. In the embodiment disclosed, the further internal cavity 7a is provided directly opposite to the other internal cavity 7, but may be provided in a different position, typically depending on the positioning of the pressure sensor element(s) 4. And, further internal cavities that the internal cavities 7 and/or 7a disclosed may be provided. Such further cavities may advantageously be configured according to one or more of the principles disclosed herein. While the fluid channel 9 is shown as being formed as a groove in the pressure sensor 3, this fluid channel may be formed as disclosed herein, e.g. in connection with FIGS. 1 or 3.

The further orifice 8a and further fluid channel 9a may have the same characteristics, such as as geometry and course as disclosed in with reference to the orifice 8 and fluid channel 9.

As illustrated in FIG. 11, the interior of the cover 1 may be provided with additional seal rims 14 internal surfaces of the cover 1. Such seal rims 14 are provided to create a seal between the inside of the cover 1 and the surface of the pressure sensor 3. Such seals may at least assist to separate the high and low pressure sides during measuring. Such seal rims may also be provided to the other embodiments disclosed herein.

In FIG. 11, an embodiment is shown which measures pressure on two sides of the sensor housing. It is therefore preferred that the two cavities are properly sealed with respect to each other. In the embodiment of FIG. 11 a longitudinal extending seal rim 14 is arranged along the longitudinal direction of the sensor/cover. Kindly observe that the FIG. 11 shows a half of a cover and that a similar or identical seal rim 14 typically is arranged in a similar or identical position in the half not shown. Further, although a single seal rim 14 is shown more than one, such as two or more, such as at least two rims may be provided to increase the sealing. Such seal rims 14 are preferably arranged parallel with each other. The embodiment of FIG. 11 also comprises seal rims 14 transversely encircling the sensor. Also for these sealing rims one or more, such as two or more, such as at least two seal rims 14 could be arranged. Such seal rims 14 are preferably arranged parallel with each other Although the sealing rim(s) 14 is(are) disclosed in connection with FIG. 11, such sealing rim(s) may also be provided in the other embodiments disclosed herein, such as the embodiment shown in FIG. 3.

Further, when more than one internal cavity 7, 7a are provided, the sealing of each internal cavity individually along its rim result (when the sealing is strong enough) in that the pressure in one internal cavity say 7, will not be affected by the pressure in another internal cavity say 7a.

As disclosed, the cover 1 of FIG. 11 further comprising (relatively to embodiment as e.g. the one of FIG. 3) a further membrane 6a made from a flexible material and defining at least a part of a wall member between the further internal cavity 6a and the exterior of the cover 1 for communicating pressure from the exterior of the cover into the further internal cavity 7a, or vice versa, by flexing the membrane. This configuration may be similar or even identical to the above disclosed configuration of internal cavity 7, membrane 6, protrusions 10 and venting opening(s) 12 pertaining to FIGS. 1-3.

A cover 1 as disclosed in FIG. 11 comprising one or more further venting openings 12a extending from the exterior surface of the cover and into the further internal cavity 7a. As disclosed in FIG. 11, the single further venting opening 12a disclosed comprising a further fluid channel 9a and a further orifice 8a, which may be shaped similar to or even identical to the fluid channel 9 and orifice 8 on the opposite side of the cover 1.

A cover 1 as disclosed in FIG. 11 is configured, during use of the cover 1, to co-operate with the pressure sensor 3 to fluidicly seal the further internal cavity 7a with the pressure sensor 3 so as to allow fluid communication between the exterior of the cover 1 and the further internal cavity 7a though said one or more further venting openings 12a.

The embodiment disclosed in FIG. 11 may also be viewed as the two opposite sides of the cover 1 are mirrors of each at least with respect to the membranes 6, 6a, the internal cavities 7, 7a and the venting openings 12, 12a; although the runs of the venting openings may be inverted. Thus, the features presented above with respect to internal cavity 7, membrane 6, fluid channel 9 and orifice 8 may equally apply to the further internal cavity 7a, further membrane 6a, further fluid channel 8a and further orifice 8a.

In many embodiments, the cover 1 is made to provide a snug-fit with the sensor 3. The snug-fit is typically provided by a combination of the geometry with a certain flexibility of the material providing elastic deformations. Such a snug-fit may also be used either alone or in combination with other sealing elements to provide the sealing of the internal cavity/cavities 7, 7a with the pressure sensor 3 when applied on the sensor 3. In some specific embodiments, the cover 1 is formed as an elongate tubular receptacle, e.g. comprising a cuboid shaped section, adapted to receive an elongate sensor 1 having a similar shape and fitting snugly inside the receptacle. This is for instance the case in the embodiments illustrated in FIGS. 1, 3, 8, 9, 10 and 11. As for some specific embodiments, two covers 1 may be used, e.g. in case of a differential pressure sensor configuration where each cover, covers fluid contact to sensor element 4.

To provide a small or even no fluid exchange between the interior cavity 7 and the exterior of the cover or for other reasons, the diameter or hydraulic diameter DH e.g. defined as $$D_H = \frac{4A}{P}$$

where A is the cross section area and P is the wetted perimeter of the cross sectional area of the fluid channel 9 (or further fluid channel 9a)—which may be considered a characteristic length scale—is typically smaller than 5.0 mm, such as smaller than 3.0 mm, preferably smaller than 2.0 mm, such as smaller than 1.0 mm, preferably smaller than 0.5 mm, such as smaller than 0.4 mm.

In some preferred embodiments, the internal cavity 7 (or further internal cavity) has a volume around 19 mm$^3$ and the fluid channel has a length of 6 mm and a volume of 0.5 mm$^3$. In the example, a bending of the membrane 6 of approximately 0.025 in the centre of the membrane result in that the fluid in the fluid channel is exchanged. This channel—or snorkel effect—may be e.g. be expressed as the ratio between the length of the fluid channel to its hydraulic diameter which in some embodiments is in the order of 21:1—this should be construed as non-limiting the scope of the invention to other ratios.

Figure 4A:
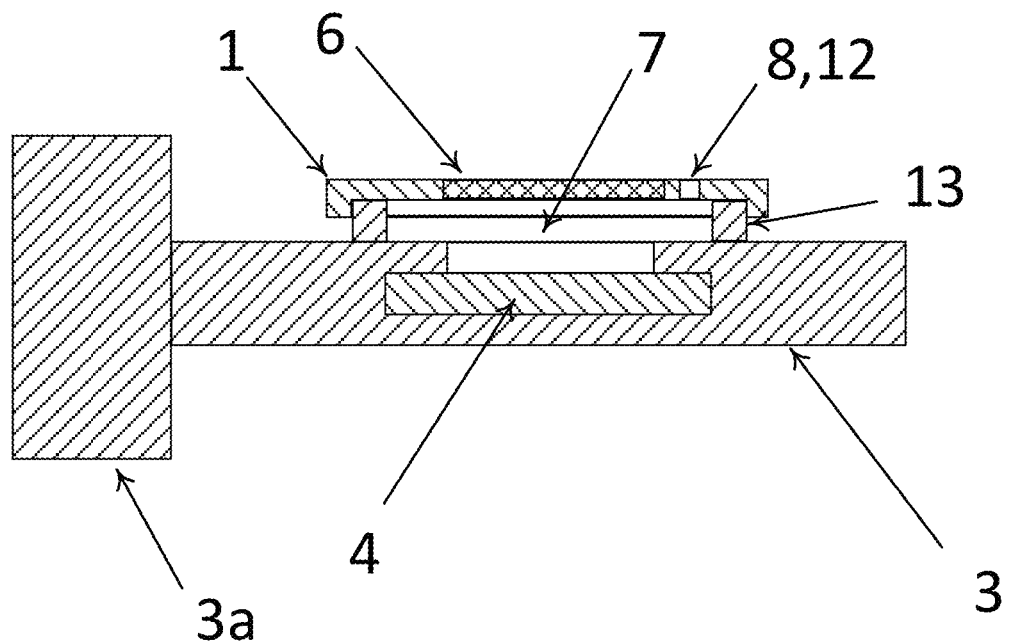
FIG. 4a is a schematic drawing illustrating a cross sectional longitudinal view through a sensor with a cover according to a third preferred embodiment of a cover and cover arrangement according to the invention.

In FIG. 4a, another embodiment of a cover 1 is disclosed. In this embodiment, the cover 1 is configured for fluidic sealing engagement with one or more engaging protrusions 13 provided on the pressure sensor 1 and encircling the sensor element 4, with the internal cavity 6 interior of the one or more engaging protrusion 13. The cover 1 in this embodiment is provided with a membrane 6 e.g. as disclosed herein. Alternatively, the cover 1 is considered a membrane 6 by its self. As disclosed the cover 1 comprising a downwardly (relatively to the orientation presented in the figure) extending part which engage with protrusion of the sensor 1. Typically, the internal dimension of the downwardly facing part is slightly smaller than the outer dimension of the protrusion of the sensor, so that the cover 1 makes a tight fit onto the engaging protrusion 13 to keep the cover 1 in its desired position and providing a fluid seal in-between the downwardly facing part and the protrusion. A venting opening 12 is providing in the cover 3 in the form of a through-going orifice 8. If desired, a fluid channel 9 may be provided in the cover 1, such as extending inside the cover 1.

Figure 4B:
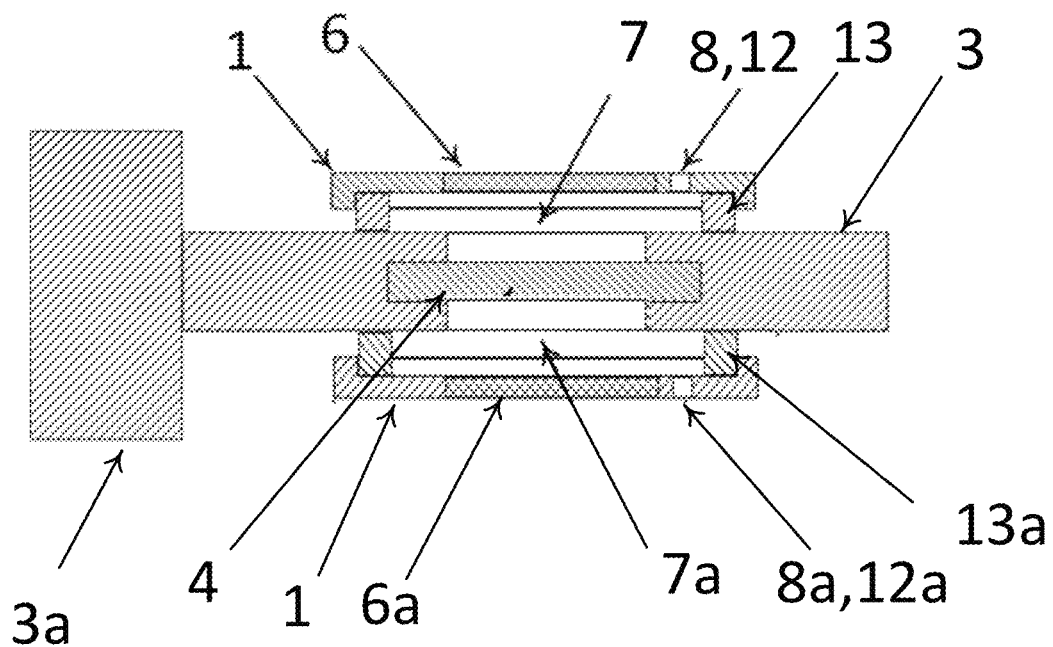
FIG. 4b is a schematic drawing illustrating a cross sectional longitudinal view through a sensor with a cover according to a fourth embodiment according to which a cover as illustrated in FIG. 4a is applied on two opposite side of the pressure sensor.

With reference to FIG. 4b which is a schematic drawing illustrating a cross sectional longitudinal view through a sensor 1 having openings into the sensor element 4 on opposite sides of the sensor. In the embodiment shown in FIG. 4b, a further engaging protrusion 13a has been provided on the pressure sensor as disclosed in connection with FIG. 4a although provided on the opposite side of the sensor 1. The covers 1 and the engaging protrusion in the embodiment shown in FIG. 4a may be viewed as mirrors of each other.

Figure 5:
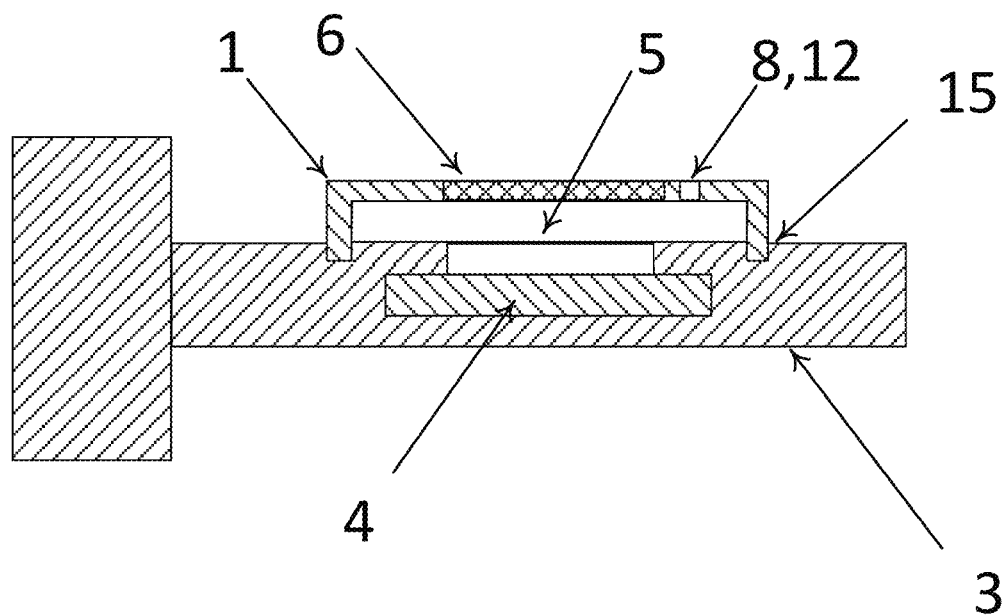
FIG. 5 is a schematic drawing illustrating a cross sectional longitudinal view through a sensor with a cover according to a sixth preferred embodiment of a cover and cover arrangement according to the invention.

FIG. 5 shows a similar embodiment to the one disclosed in FIGS. 4a and 4b except that the engaging protrusion 13 of the sensor in FIGS. 4a and 4b has been replaced by a groove 15. Accordingly, the cover 1 is configured for fluidic sealing engagement with one or more grooves 15 provided in the pressure sensor and encircling the sensor element 4, with the internal cavity 7 interior of the one or more grooves.

Figure 6:
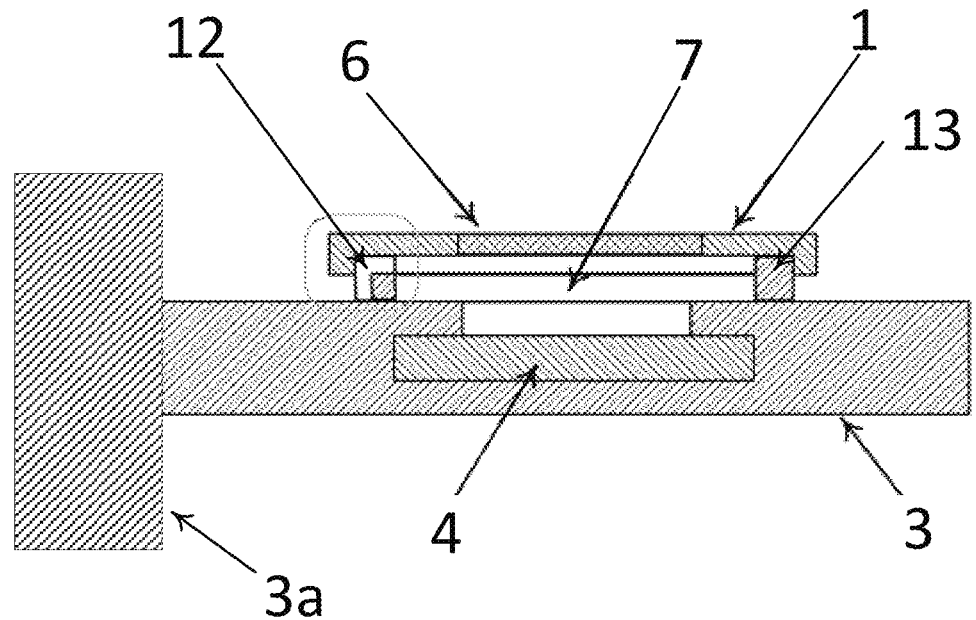
FIG. 6 is a schematic drawing illustrating a cross sectional longitudinal view through a sensor with a cover according to a seventh preferred embodiment of a cover and cover arrangement according to the invention; in the figure, the venting opening is highlighted by being encircled.
Figure 7:
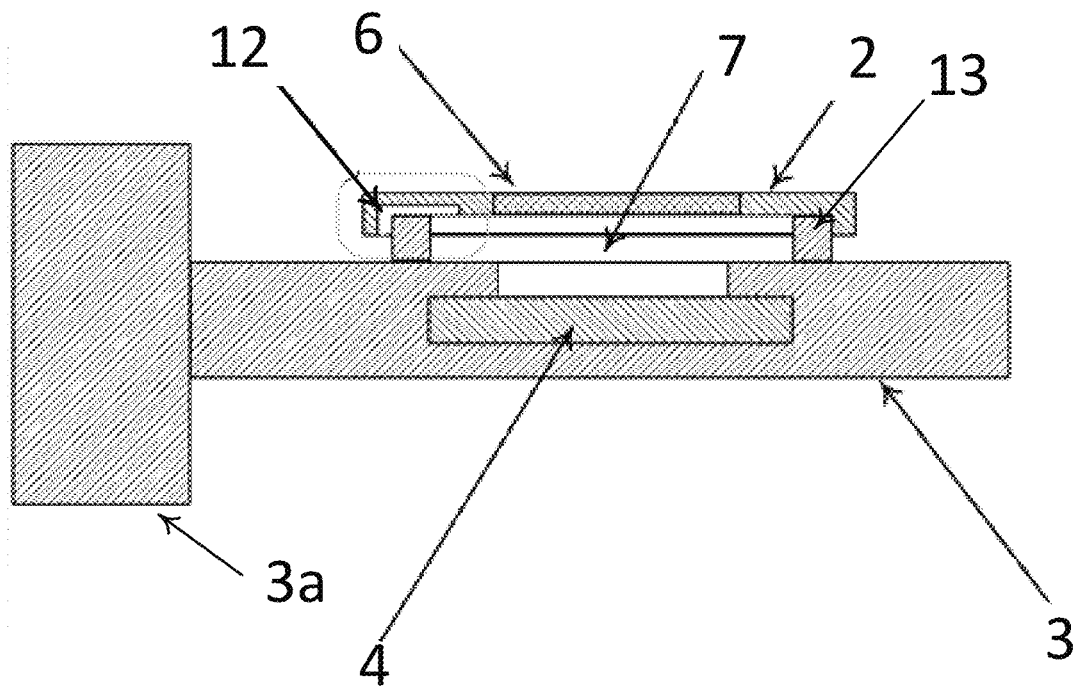
FIG. 7 is a schematic drawing illustrating a cross sectional longitudinal view through a sensor with a cover according to an eight preferred embodiment of a cover and cover arrangement according to the invention; in the figure, the venting opening is highlighted by being encircled.

With reference to FIGS. 6 and 7 which are schematic drawings each illustrating a cross sectional longitudinal view through a sensor 3 with a cover 1 wherein the cover 1 is arranged in sealingly engagement with an engagement protrusion 13 as disclosed in connection with FIG. 4a and FIG. 4b.

In the embodiment shown in FIG. 6, the venting opening 12 is provides as channel formed in the outside engaging protrusion which channels has an opposite L-shape of the cover 1. Thereby a channel is formed in between the engaging protrusion 13 and the cover 1 forming the venting opening 12. This is highlighted in FIG. 6 by the squared encircling around the venting opening 12. It is noted that dimensioning of the venting opening 12 may preferably be as otherwise disclosed herein.

In the embodiment shown in FIG. 7, the venting opening 12 is provides as channel formed in the inside of the cover 1 extending from a position close to the engaging protrusion 13 upwardly towards a bend preceding into a horizontal channel section. This is highlighted in FIG. 7 by the squared encircling around the venting opening 12. It is noted that dimensioning of the venting opening 12 may preferably be as otherwise disclosed herein.

It is noted that although the membrane 6 in the embodiment shown in FIGS. 4-7 is shown as a part of the cover 1, the membrane may be provided by the cover itself by the cover 1 being made from a single material or composition of material and the membrane may in such embodiments be designated as the section of the cover 1 facing towards the sensor 3—for instance, in FIG. 5, the vertical section of the cover 1 having a section extending into the groove 15 is typically not considered to form part of the membrane 1, but a structural element of the cover 1. In embodiments, where the membrane 6 forms a separate part of the cover 1, the membrane may be made from a material being more flexible than the remainder of the cover 1, and/or the membrane 6 may be thinner that the material of the cover encircling the membrane. Further, protrusions 10 as disclosed e.g. in connection with FIG. 3 may be applied on the membrane.

Figure 8:
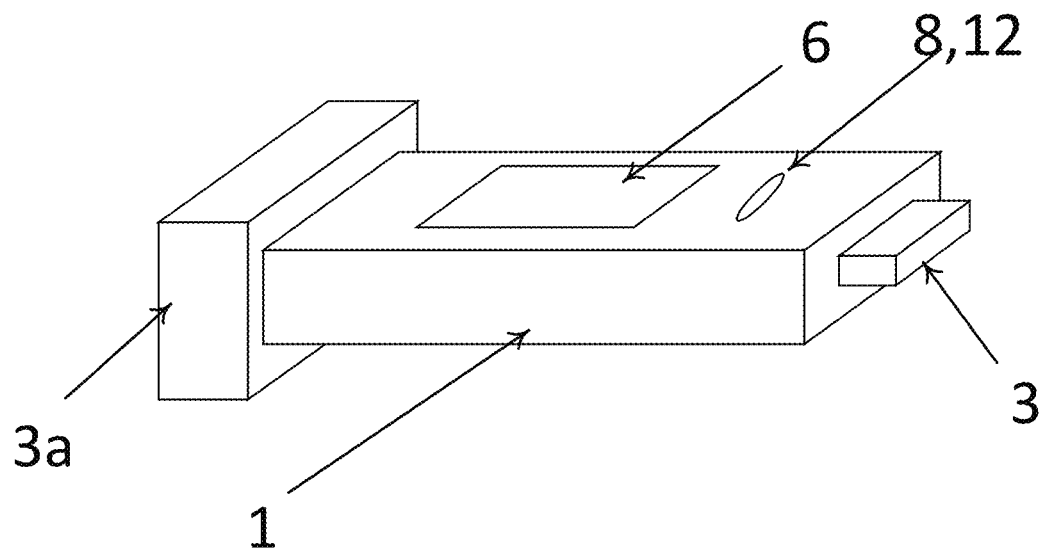
FIG. 8 is a schematic perspective drawing illustrating a ninth embodiment of a cover applied on a pressure sensor.
Figure 9:
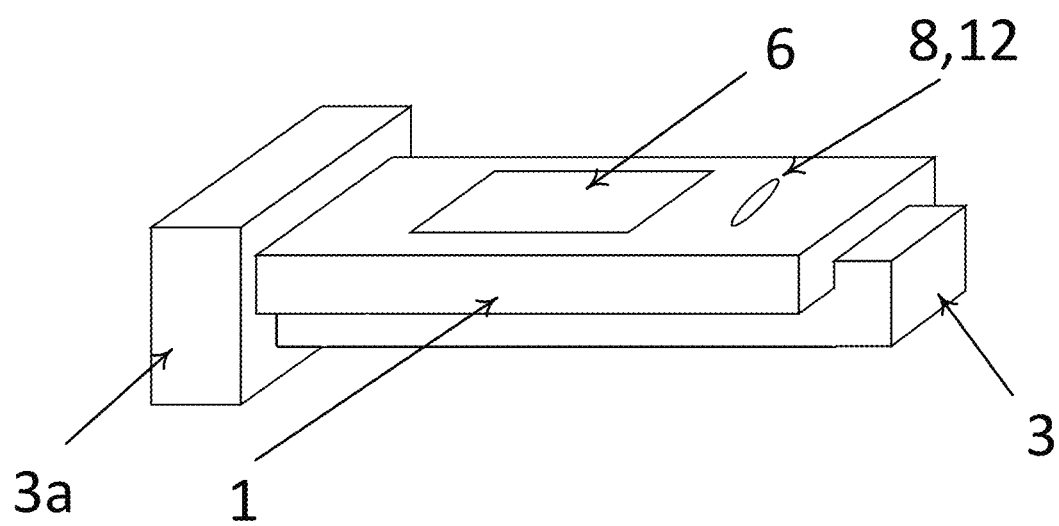
FIG. 9 is a schematic perspective drawing illustrating a tenth embodiment of a cover applied on a pressure sensor.

Reference is made to FIG. 8 schematically illustrating that the cover 1 may be shaped as a sleeve into which the sensor 3 is received, which cover 1 is open at both ends, so that a section of the sensor may extend outside both ends of the cover 1. In FIG. 9 an embodiment of a cover 1 covering only a section of the sensor 1 is disclosed; in the disclosed embodiment, the cover 1 cover partly an upper surface and partly two side surfaces of the sensor 3. In both these embodiments, the cover 1 designed to provide a snug-fit onto the sensor 3.

The cover 1 is in some embodiment made from single material or a single material composition, such as a material having a Young's modulus between 0.0005 GPa and 0.5 GPa, such as between 0.01 and 0.2 GPa. In some preferred embodiments, silicone rubber with a Young's modulus of around 0.0007 GPa (shore A 30) is used. Suitable materials are found to be a material selected from the group consisting of rubber, silicone, plastic, polymer, composite materials, metal(s) (where metal(s) preferably having a Young's module around or above 200 GPa, but metal(s) with a lower values of Young's module than 200 GPa may be used) or composition thereof. The cover 1 may in some embodiments be moulded, such as injection moulded or 3D-printed as one piece. In such embodiments the membrane 6 may be provided by the geometry of the cover 1, where the membrane 6 typically is provided by a designated region of the cover 1 having a smaller wall thickness than other regions and/or by the internal cavity is formed as an open ended cavity with its opening facing, during use, towards the pressure sensor, and being delimited opposite to said opening at least partly by the membrane 6.

The invention also relates to a method of providing an at least partly covered pressure sensor. According to this, the sensor is typically of a type providing an electrical readout representative of a measured pressure, and the method comprising arranging a cover 1 as disclosed herein on a pressure sensor 3.

The invention also relates to providing measurement by use of a sensor 3 having a cover 1 as disclosed herein arranged to partly cover the pressure sensor 3. The method typically comprises arranging the at least partly covered pressure sensor in a fluid, preferably fluid in a pump, valve, manifold, pipe or boiler, and obtaining the electrical readouts from the pressure sensor.

Although considered within the scope of the invention to pre-fill the internal cavity 7 with a fluid e.g. during application and before measuring, it is generally preferred not pre-fill the internal cavity with fluid, as this could add cost and complexity to the manufacturing. A better solution appears to be to ensure a fast and efficient ventilation of the internal cavity 7 by means of the venting openings 12.

The scope of the invention should not be limited to a cover, as the scope of the invention also includes an at least partly covered pressure sensor comprising a pressure sensor 3 at least partly covered by a cover 1 as disclosed herein.

Further, the scope of the invention also includes a method for protecting a pressure sensor comprising a sensor element 4 arranged in the pressure sensor 3, wherein at least a part of the sensor element 4 is exposed to the exterior of the pressure sensor 1. Such as method typically comprises the step of arranging a cover 1 as disclosed herein to fluidicly seal the internal cavity 7, 7a with the pressure sensor 3 so as to allow fluid communication between the exterior of the cover and the internal cavity 7, 7a though said one or more venting openings 12.

While the disclosure herein has been focussed towards embodiments wherein a single venting opening is provided to allow fluid communication between the internal cavity and the exterior, more than one such venting openings may be provided. According, when the venting opening comprising a fluid channel, more than one such fluid channel may be provided. If more than one fluid channel is provided, these fluid channel may be in fluid communication with a single, common orifice or each be in fluid communication with an orifice individually for each channel. Further, if more than one fluid channel is used, they are mutually arranged so that they do not configure a flow path from the fluid channels' openings into the internal cavity which constitute a flow path across the sensor element, as this could result in a production fluid through the internal cavity.

As presented herein, when the pressure sensor with cover is used for pressure measurements, the venting opening is not closed intentionally with a plug or the like.

Orientations, such as upper and lower, and sizes, such as height and depth, should not be limited to orientations relatively to gravity and are typically used to reference an orientation or dimension relatively to another element. Further, some of the cross sectional views presented herein, preferably shows one half of the cover, and the other half could preferably be as the half shown, such as could preferably mirrored in the cut-plane. Accordingly, the covers e.g. FIG. 3 (upper part), 10a (lower part) and 11 may be symmetrical along the cut-plane, besides that e.g. the fluid channel 9 may extend assymetrical, such as meandering. However, the invention is not limited to this.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Cover
2 Receptacle for receiving a sensor
3 Sensor
3a base part
4 Sensor element
5 Opening (recess) in sensor into sensor element
6 Membrane
6a Further membrane
7 Internal cavity
7a Further internal cavity
8 Orifice
8a Further orifice
9 Fluid channel
9a Further fluid channel
10 Protrusion
11 Pressure port
12 Venting opening
12a Further venting opening
13 Engaging protrusion
13a Further engaging protrusion
14 Seal rims
15 Groove in pressure sensor
16 Sealing protrusion
17 Opening for inserting a pressure sensor

The invention claimed is:

1. A pressure sensor with a cover, the pressure sensor comprising
    a pressure sensor element;
    a pressure sensor housing accommodating the sensor element, the cover being configured to cover the pressure sensor element and for providing an internal cavity in-between the cover and the sensor element, the cover comprising:
        a membrane made from a flexible material and defining at least a part of a wall member between the internal cavity and the exterior of the cover for communicating pressure from the exterior of the cover into the internal cavity, or vice versa, by flexing the membrane;
        one or more venting openings extending from the exterior surface of the cover and into the internal cavity, wherein the cover is configured to co-operate with the pressure sensor to fluidicly seal the internal cavity with the pressure sensor so as to allow fluid communication between the exterior of the cover and the internal cavity though said one or more venting openings.

2. A pressure sensor with a cover according to claim 1, wherein the internal cavity is at least partly formed in the cover as an open ended cavity with its opening facing towards the pressure sensor, and being delimited opposite to said opening at least partly by said membrane.

3. A pressure sensor with a cover according to claim 1, further comprising one or more protrusions provided on an interior surface of the membrane and extending into the internal cavity.

4. A pressure sensor with a cover according to claim 3, wherein the one or more protrusions are provided as one or more segments not circumscribing a closed loop.

5. A pressure sensor with a cover according to claim 3, wherein, one or more of the protrusions provided on an interior surface of the membrane and extending into the internal cavity extend into the cavity by an amount being less than a depth of the cavity.

6. A pressure sensor with a cover according to claim 1, wherein the cover is produced with a thickness of the membrane which is less than 1.0 mm, and which is larger than 0.25 mm.

7. A pressure sensor with a cover according to claim 1, wherein the cover forms a tubular receptacle comprising a cuboid shaped section, for housing the pressure sensor or at least a part thereof.

8. A pressure sensor with a cover according to claim 7, wherein the cover has an opening at one end for inserting the pressure sensor or at least a part thereof into the tubular receptacle.

9. A pressure sensor with a cover according to claim 8, wherein the cover at the end distal to the opening for inserting the pressure sensor is open or closed.

10. A pressure sensor with a cover according to claim 1, wherein the cover further comprises one or more longitudinal extending seal rims arranged along the longitudinal direction of the cover.

11. A pressure sensor with a cover according to claim 1, wherein the cover further comprises one or more seal rims transversely encircling the sensor.

12. A pressure sensor with a cover according to claim 1, wherein the membrane is made from a material having a Young's modulus between 0.0005 GPa and 0.5 GPa, made from a material selected from the group consisting of rubber, silicone, plastic, polymer, composite materials or compositions thereof.

13. A pressure sensor with a cover according to claim 1, wherein the membrane is made from a corrugated metal sheet.

14. A pressure sensor with a cover according to claim 1, wherein the material of the cover in which the membrane is provided is made from a material selected from the group consisting of rubber, silicone, plastic, polymer, composite materials, metal(s) or compositions thereof.

15. A pressure sensor with a cover according to claim 1, wherein one or more of the one or more venting openings comprises a fluid channel extending between the internal cavity and an orifice provided in the exterior of the cover thereby providing a fluid passage extending between the internal cavity and the exterior of the cover.

16. A pressure sensor with a cover according to claim 15, wherein the orifice is arranged at a distance from the membrane.

17. A pressure sensor with a cover according to claim 15, wherein the fluid channel opens into the orifice at a position being distal (distant) to the internal cavity.

18. A pressure sensor with a cover according to claim 15, wherein the fluid channel has a cross sectional area which is less than a cross sectional area of the internal cavity, wherein the cross sectional area of the internal cavity is defined as the surface area of the membrane.

19. A pressure sensor with a cover according to claim 15, wherein the fluid channel extends meandering.

20. A pressure sensor with a cover according to claim 15, wherein the fluid channel extends away from the internal cavity in a direction having a vector component which is parallel with the plane defined by the opening of the open ended cavity and wherein the fluid channel opens into the orifice at position being distal to the internal cavity.

21. A pressure sensor with a cover according to claim 15, wherein cover has a longitudinal extension and the fluid channel extending between the internal cavity and the orifice is having a component which extends along a direction having a vector component which is parallel to the longitudinal extension of the cover.

22. A pressure sensor with a cover according to claim 15, wherein the orifice is a through-going opening extending between the exterior surface and the interior surface of the cover and wherein the fluid channel is provided by a groove formed in the interior surface of the cover, the groove extends between the internal cavity and the orifice, and wherein at least a section of the interior surface of the cover surrounding the groove and the orifice is made from a material providing, during use, a fluidic seal against a surface of a pressure sensor.

23. A pressure sensor with a cover according to claim 15, wherein the fluid channel extends inside the cover between the interior and exterior surface of the cover and the orifice extends from the exterior surface and into the fluid channel.

24. A pressure sensor with a cover according to claim 15, wherein the hydraulic diameter of the fluid channel(s) is smaller than 5.0 mm.

25. A pressure sensor with a cover according to claim 1, wherein the venting opening into the internal cavity is configured to provide a snorkel effect by comprising a volume being larger than the change in volume of the internal cavity, evaluated during use of the pressure sensor with cover.

26. A pressure sensor with a cover according to claim 1, wherein the internal cavity is in fluid communication with a sensing surface of the sensor element and wherein the venting opening is offset from sensing surface, such as offset from an edge of the sensing surface and/or internal cavity in a direction parallel to a longitudinal axis of the sensor.

27. A pressure sensor with a cover according to claim 1, wherein the open ended cavity having one or more wall sections extending in direction away from said opening towards said membrane, wherein the one or more venting openings extending from one or more of said one or more wall sections in a direction away from internal cavity.

28. A pressure sensor with a cover according to claim 1, wherein one or more of the one or more venting openings is/are provided by an orifice provided in the exterior of the cover, extending through-going the cover and being configured for cooperating with a fluid channel, provided in a surface of the pressure sensor, said fluid channel extending between said internal cavity and said orifice, so as to provide, during use, a fluid passage extending between said internal cavity and the exterior of the cover.

29. A pressure sensor with a cover according to claim 1, wherein the cover comprises a pressure port in a position distinct from the internal cavity, the pressure port is a through-going opening extending between the interior surface of the cover and the exterior of the cover, wherein a section of the interior surface of the cover surrounding the pressure port is made from a material for providing, during use, a fluidic seal against a surface of a pressure sensor.

30. A pressure sensor with a cover according to claim 29, wherein the cover comprises a sealing protrusion encircling the inner opening of the pressure port and protruding towards a surface of the sensor.

31. A pressure sensor with a cover according to claim 1, the cover being further configured for providing a distinct further internal cavity in-between the cover and the sensor element and distant from said internal cavity the cover further comprising:
  a further membrane made from a flexible material and defining at least a part of a wall member between the further internal cavity and the exterior of the cover for communicating pressure from the exterior of the cover into the internal cavity, or vice versa, by flexing the membrane;
  one or more further venting openings extending from the exterior surface of the cover and into the further internal cavity,
  wherein the cover is configured to co-operate with the pressure sensor to fluidicly seal the further internal cavity with the pressure sensor so as to allow fluid communication between the exterior of the cover and the further internal cavity though said one or more further venting openings.

32. A pressure sensor with a cover according to claim 1, wherein the cover is configured for fluidic sealing engagement with one or more engaging protrusions provided on the pressure sensor and encircling the sensor element, with the internal cavity interior of the one or more protrusion.

33. A pressure sensor with a cover according to claim 1, wherein the cover is configured for fluidic sealing engagement with one or more grooves provided in the pressure sensor and encircling the sensor element, with the internal cavity interior of the one or more grooves.

34. A pressure method of measuring pressure, the method comprising
  providing an at least partly a pressure sensor with a cover, configured to cover a sensor element and for providing an internal cavity in-between the cover and the sensor element, the cover comprising: a membrane made from a flexible material and defining at least a part of a wall member between the internal cavity and the exterior of the cover for communicating pressure from the exterior of the cover into the internal cavity, or vice versa, by flexing the membrane; one or more venting openings extending from the exterior surface of the cover and into the internal cavity, wherein the cover is configured to co-operate with the pressure sensor to fluidicly seal the internal cavity with the pressure sensor so as to allow fluid communication between the exterior of the cover and the internal cavity though said one or more venting openings, and
  arranging the at least partly covered pressure sensor in a fluid, preferably fluid in a pump, valve, manifold, pipe or boiler, and obtaining the electrical readouts from the pressure sensor.

35. A pressure method for protecting a pressure sensor comprising a sensor element arranged in the pressure sensor, wherein at least a part of the sensor element is exposed to the exterior of the pressure sensor, the method comprising
  arranging a cover configured to cover a sensor element and for providing an internal cavity in-between the cover and the sensor element to fluidically seal said internal cavity with the pressure sensor so as to allow fluid communication between the exterior of the cover and the internal cavity though one or more venting openings, wherein the cover comprising: a membrane made from a flexible material and defining at least a part of a wall member between the internal cavity and the exterior of the cover for communicating pressure from the exterior of the cover into the internal cavity, or vice versa, by flexing the membrane; the one or more venting openings extending from the exterior surface of the cover and into the internal cavity, wherein the cover is configured to co-operate with the pressure sensor to fluidicly seal the internal cavity with the pressure sensor so as to allow fluid communication between the exterior of the cover and the internal cavity though said one or more venting openings.

* * * * *